Figure 1:
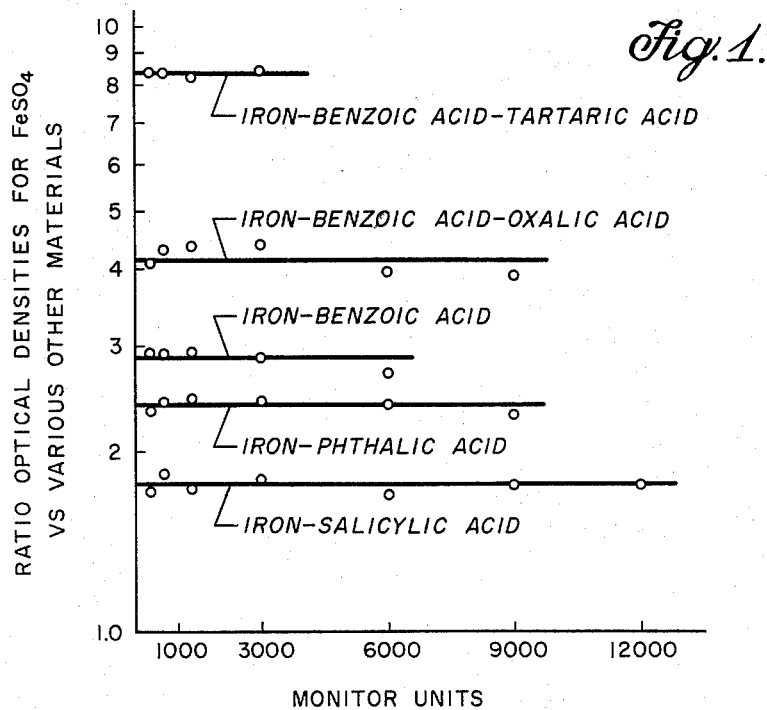

INVENTORS.
WILLIAM R. BALKWELL, JR.
BY GAIL D. ADAMS, JR.

ATTORNEY.

2,936,372
RADIATION DOSIMETER

William R. Balkwell, Jr., San Francisco, and Gail D. Adams, Jr., Larkspur, Calif., assignors to the United States of America as represented by the United States Atomic Energy Commission Application June 26, 1957, Serial No. 668,266

15 Claims. (Cl. 250—83)

This invention relates in general to colorimetric chemical dosimeters for the measurement of ionizing radiations, and more particularly to a stabilized-sensitized, ferrous-ferric type of colorimetric dosimeter.

Increased applications of atomic reactors, X-ray equipment, radioactive tracers and isotopes, particle accelerators and other nuclear radiation sources have brought about wide use and development of methods of accurately measuring ionizing radiations. Concurrent therewith there has occurred intensive development of dosimeters to more accurately measure doses in particular ranges and under specific conditions. This is particularly true in clinical medicine, where information about dosages in the range of 1 to 1000 rad., roentgen, rem., or other equivalent units is most frequently desired. For example, whole body gamma radiation doses in the range of 400–600 rad. would nearly always produce a mortality in humans of about 50%, and serious illness or damage in the individual survivors. Unfortunately, many of the more reliable dosimetric means are not sufficiently accurate to meet the stringent requirements for medical application and research, the great bulk of the quantitative detection methods requiring exposure to excessive quantities of radiation, being usually adapted to detection or measurements in the kilo-roentgen range. While specalized electronic equipment would be sufficiently accurate, it is frequently prohibitively expensive or heavy and bulky. Film techniques are slow or inaccurate in many cases. Liquid colorimetric chemical dosimeters are a potential solution because of the ease with which measurements can be made without expensive equipment and with much less difficulty of interpretation. Therefore the simplicity of a liquid colorimetric dosimeter permits convenient use in nuclear weapon tests, nuclear warfare, civilian defense, industrial nuclear power, material measurements with ionizing radiation and other applications where cumbersome equipment and complicated methods cannot be tolerated.

Numerous workers accept the ferrous-ferric sulfate chemical dosimetric system as the best chemical method for measuring X- and $\gamma$-rays in kiloroentgen doses at dose rates of at least 1000 r./min. and such a system meets most of the basic requirements of an ideal chemical dosimetric system. The ferrous-ferric sulfate dosimetric system was first described by Fricke and Morse in Am. J. Roentgenol. Radium Therapy, vol. 18, 430 (1927) and was developed by N. Miller, J. Chem. Phys. 18, 79 (1950). However, the ferrous-ferric system as heretofore developed lacks characteristics which would permit use for purposes noted hereinbefore. Present applications are limited to the measurement of large radiation doses in the laboratory. The system is not suitable for field dosimeters. Even laboratory usage has its limitations. One problem is that relative sensitivity decreases with lower dosages. Doses less than 1000 rad. cannot be reliably measured by this method. Varying amounts of dissolved oxygen, carbon dioxide and other material cause unpredictable and uncertain amounts of the ferrous ions to be oxidized by identical amounts of ionizing radiations. There is evidence to indicate that the system is temperature dependent. Absence of dissolved oxygen or presence in less than normal amounts also causes changes in sensitivity. Another difficulty with the conventional ferrous-ferric system is that it is not stable for long periods of time. Atmospheric oxygen constantly causes oxidation if the liquid is open to air. Other difficulties are that the system is sensitive to heat and sunlight, and that recrystallized reagents must be used in order to remove the last traces of organic matter. The organic matter itself ordinarily alters the color absorption mechanism upon being oxidized, thereby producing very erratic indications. Color change under such circumstances is an unreliable indication of the actual dosage.

Now it has been discovered that the ferrous-ferric colorimetric system can be made a truly quantitative measure of irradiation dosage in the lower ranges by the addition of specific amounts of certain stabilizing-sensitizing agents. Specifically the addition of agents such as organic acids having one or more substituent carboxylic groups and in some cases hydroxy groups, which are capable of complexing components of the ferrous-ferric system have been found to yield a system which is both more stable and more sensitive to ionizing radiations. The stabilized dosimetric system is not influenced by variations in the amounts of dissolved oxygen or other materials and the presence of impurities in general. Also, the system is much more independent of temperature and not subject to the spurious and other types of oxidations mentioned previously. Therefore, the stabilized system of the invention may be employed under many more circumstances to obtain much more accurate data and in dosage ranges wherein, heretofore, such operation was impracticable. Moreover, standardized dosimeters incorporating the stabilized system may now be provided for use at a subsequent time.

Accordingly, it is an object of the invention to provide methods for determining dosages absorbed from ionizing radiations.

Another object of the invention is to provide a colorimetric dosimetric system for indicating dosages absorbed from ionizing radiations.

Still another object of the invention is to provide a stabilized-sensitized ferrous-ferric colorimetric dosimetric system for measuring dosages of gamma and beta rays.

A further object of this invention is to provide a ferrous-ferric colorimetric dosimetric system sufficiently stable for long term storage and accurate in the range of less than 1000 rad. total dose.

A still further object of this invention is to provide a stabilized ferrous-ferric colorimetric dosimetric system of high sensitivity and which is unaffected by dissolved oxygen.

A further object of this invention is to provide a ferrous-ferric radiation dosimetric system which is stabilized with an organic compound having one or more carboxylic or equivalent groups to improve the accuracy of the indication.

A still further object of the invention is to provide a dosimeter incorporating a stabilized ferrous-ferric colorimetric dosimetric system.

Figure 2:
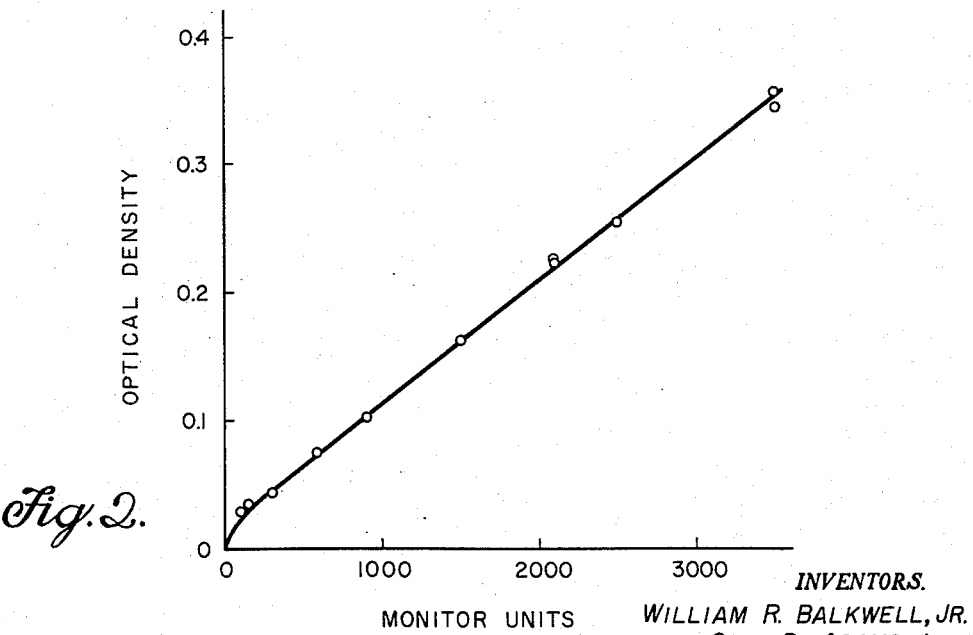

Other objects and advantages of the invention will become apparent by consideration of the following description and accompanying drawing, of which:

Figure 1 is a plot of the relative sensitivity of the dosimetric system of the invention as compared with the sensitivity of the older ferrous-ferric dosimetric system; and Figure 2 is a plot of the optical density of a ferrous-ferric dosimeter system containing benzoic acid stabilizer versus irradiation dosage.

The stabilized-sensitized ferrous-ferric dosimetric system is prepared and utilized in a generally similar fashion to the conventional ferrous-ferric system with advantageous modifications and simplifications made possible by novel characteristics of the present system.

More specifically, such systems are prepared by providing a sulfuric acid solution of the appropriate concentration and dissolving ferrous sulfate therein. The sulfuric acid concentration may range between about 0.1 and 2.0 N with the optimum at about 1.0 N which concentration is preferred. Ferrous sulfate concentrations in the range of about $10^{-4}$ to $2 \times 10^{-3}$ M are generally suitable with a preferred value of $7 \times 10^{-4}$ M. With the present system reagents of a reasonable purity may be used while with the conventional system, e.g., even analytical grade ferrous sulfate required recrystallization to obtain the necessary purity. In the present case analytical grade reagents exceed the necessary requirements.

In accordance with the invention a stabilizing-sensitizing agent is included in the foregoing system in amounts of the order of $10^{-4}$ M with variations from this value for particular agents as will be disclosed more fully hereinafter. The agent is believed to effect the desired stabilizing result by complexing the iron ions in the system. The most effective agents found in practice were benzoic, phthalic and salicylic acids, and aspirin (sodium acetyl salicylate) with reference to superior stability and sensitivity properties. Other aromatic, aliphatic acids and hydroxy acids having slightly less effective properties, either singly or in combination with another are oxalic, citric, succinic, lactic, phenolic, tartaric, sulfosalicylic, acetic, 1,2,3,4 butane tetracarboxylic, malonic, maleic and adipic acids, and hexylene glycol. The highest irradiation sensitivity is obtained when oxalic or tartaric acid in combination with benzoic acid is included in the dosmetric system. The beneficial effect of the carboxylic acids is frequently offset when additional functional groups are present in the same organic acid, e.g., amine groups and sulfonic acid groups. Hence effective reagents have been found in practice to be quite positively restricted to materials of the above categories. Illustratively, with benzoic acid a preferred concentration within the range of $3 \times 10^{-4}$ to $2 \times 10^{-3}$ M is used. Concentrations in the range of the order of $10^{-2}$ to $10^{-4}$ may be used. When oxalic or tartaric acids are used in combination with the benzoic acid a concentration of 0.5 to 3.5 grams per liter for the oxalic or tartaric is used, 1.0 to 1.5 grams per liter being preferred. Similar ranges of concentration are contemplated for the other acids and combinations.

In connection with the foregoing, it should be noted that sulfuric acid is unique for the present purpose since other strong acids permit the formation of undesirable complexes and otherwise interfere with the operation of the system. Moreover, the concentration is somewhat critical since below about 0.5 N the iron is hydrolyzed and above 2.0 N, the solution density is outside normal requirements for a dosimeter. Also, at higher acid concentrations, the stabilizer may be oxidized. Further, a substantial acid concentration is required to assure that the organic acid stabilizer is in the undissociated effective form.

Upon irradiation of the foregoing system with ionizing radiation such as X-ray and gamma rays, low energy beta rays or secondary radiation produced by the interaction of high energy radiation on matter in the vicinity of the system, the radiation is absorbed in such a manner that ferrous ions are oxidized to ferric with a concurrent color change or change in optical density at particular wave lengths. In the conventional system, the irradiated (ferric) system possesses a maximum density change in the vicinity of 3000 A. with wave lengths of 2700–3250 A. giving generally reproducible results. The color changes from colorless to the amber color of ferric solutions is correlated with the irradiation dosage and more accurate determinations are made with an optical spectrophotometer.

With the stabilized systems of the invention, because of the complexing nature of the agents, the optimum optical density wave length generally shifts to a somewhat shorter wave length, i.e., the general range being 2,600–3050 A. Peak of the absorption curve for oxalic or tartaric acid generally appears between 2700 and 2900 A.; for citric, succinic, lactic and hexylene glycol, 3000 A.; for salicylic, 2958 A.; and for phthalic, 2790 A. With benzoic acid an absorption peak several hundred Angstroms wide is formed, centering at about 2725 A. Addition of either oxalic or tartaric, in the concentrations indicated, to benzoic acid does not change the overall spectra significantly from that of benzoic acid. Due to the sharpness of the benzoic acid absorption peak the most sensitive results are obtained with such agent. The wave length at which peak absorption occurs varies with variations in the concentrations of the various reagents and particular reagents employed due to shifts in the complicated equilibria involved and the different complexes which are formed under different conditions. However, with standardized conditions highly reproducible results are obtained thereby greatly simplifying quality control.

To utilize the dosimetric system of the invention in measuring radiation dosages, procedures and equipment similar to those employed with the conventional ferrous-ferric or other dosimetric systems are followed. A convenient amount of the system is disposed in a container and exposed to the radiation to be measured. The response of the system is independent of volume and therefore the volume employed is determined by consideration of the amount required in standard containers for spectrophotometric or other standardized optical density measurement. Stoppered or sealed glass or suitably prepared plastic vials of standard sizes are employed, e.g., in a personnel dosimeter, where the system is to be exposed to vibration, upset, etc., to prevent loss. Exterior cases may be employed to protect the vials from breakage and to serve as a primary radiation converter as discussed hereinafter. Either sealed or open vials may be employed in stationary or laboratory operations.

The contained system, or dosimeter, is disposed at an appropriate or convenient location in the beam of radiation or irradiated area at which the dosage is to be measured. Beta radiation or any energetic electron beam can be measured directly as may low energy X and gamma radiation. However, with high energy ionizing radiation a target material, e.g., the exterior case of the dosimeter, is provided to convert the radiation into large quantities of secondary electron radiation for more effective indication and for better interpretation of the exposure data. In any event, exposure as indicated causes amounts of the ferrous ions to be converted to ferric which conversion is correlated with the absorbed dosage of radiation and with a corresponding change in optical density, this change being determined subsequent to exposure. The dosage is then determined from calibration curves or data prepared by exposure of comparable standard dosimeters under standard conditions to known amounts of radiation. Since the density of the system is very close to that of biological materials the obtained results provide dosage data of directly applicable biological and clinical importance.

The mechanisms whereby the stabilizing agents influence the behavior of the system are complicated and are not completely understood. The agents are known to chelate or complex the iron species in such a way as to prevent spurious oxidation by air or oxygen. However, the oxidation produced on irradiation with ionizing radiation is enhanced several fold. Moreover, the optical density of the oxidized iron is increased several fold by the complexing agent, benzoic acid, for example, by a factor of at least three and further addition of oxalic or tartaric acid may enhance by an even larger factor.

More particularly, in conventional terminology, "G" is defined as the number of ferrous ions oxidized to ferric for each 100 e.v. of energy absorbed from the radiation. The benzoic acid stabilized system has a "G" of 45 compared to about 15 for a comparable conventional ferrous-ferric system. With oxalic acid added, "G" may exceed 60 and tartaric acid may give a value of 130 under certain circumstances. However, reliability of the systems appears to decrease as "G" is increased much beyond 45. The reliability or reproducibility of the benzoic acid stabilized system is easily within 2% for an absorbed dose of 500 rads.: The optical density change can be read to ½%. Reproducibility decreases progressively below 100 rad. The other indicated agents behave similarly.

Furthermore, the stabilized system is not subject to air oxidation over very long periods of time. For example, a stock volume of benzoic acid stabilized dosimeter solution was stored for more than eleven months in an unstoppered bottle with no oxidation detectable by periodic observation with an optical spectrophotometer. Special handling is therefore not necessary either before, during or after irradiation. The nature of the container is not exceptionally critical and stoppered or unstoppered vials, or the like made of inert plastic or glass are suitable. Sealed vials of a standard configuration or modified for convenience are also satisfactory. Optical measuring equipment may be used as desired or as indicated below.

Further details of the dosimetric system and procedures of the invention will be disclosed in the following illustrative examples:

EXAMPLE I

In order to determine the sensitivity of various dosimetric systems, volumes of a stock conventional ferrous-ferric dosimetric solution were made up with the following stabilizing-sensitizing agents added: benzoic acid both alone and in combinations with oxalic and tartaric acids, phthalic acid, salicylic acid, aspirin, citric acid, succinic acid, lactic acid, phenolic acid, hexylene glycol, tartaric acid, sulfosalicylic acid, acetic acid, 1,2,3,4 butane tetracarboxylic acid, maleic acid and adipic acid. Several other combinations of carboxylic acids were also used, as indicated in Table I which shows the compositions and concentrations of the solutions, as well as other conditions of the experimentation and the results thereof.

Each of the solutions was made up as follows: to one or more liters of distilled water, concentrated sulfuric acid was added until the solution was 1.0 N, or to other concentrations as indicated in Table I. Ferrous sulfate was added in the form of a concentrated solution, generally to a final concentration of the order of $7 \times 10^{-4}$ M with respect to ferrous ions. Where concentrations are shown as only approximate in Table I, the value is accurate to within 1 or 2%. Finally the agent was added in the amount indicated in Table I, $3 \times 10^{-3}$ M being the general order of magnitude. Aliquots were taken from each of the stock solutions for irradiation and comparison of the optical densities, in the manner hereinafter stated. Small glass reagent bottles or vials with polyethylene tops were used as irradiation containers. The bottles were shaped to provide a generally elongated rectangular interior cavity such that when filled with a 50 cc. aliquot the volume of the liquid was approximately in the shape of a cube.

All irradiations were carried out with a 70 mev. synchrotron in which primary electrons from a filament were accelerated to an energy of 70 mev. and impinged upon a platinum target. Any suitable target material of high Z may be used likewise. With lower energy radiation the heavy metal target will generally be tungsten for technological reasons. A spectrum of X-rays having energies as high as 70 mev. emerged from the platinum target and after collimation were caused to penetrate a block of tissue equivalent material, i.e., compressed resin bonded cellulosic material having a density and effective atomic number equivalent to that of water for conversion to electrons (beta rays). The sample bottles were placed within the block which was about 8 x 8 x 12 inches in linear dimensions. The beam of secondary electrons in the tissue equivalent material produced by the X-ray photons also has a spectrum of energies ranging up to 70 mev., although predominantly in the lower part of the distribution. Usual irradiation dosages were 560 rad., although a few were carried out with a much lower amount. The average time dosage rate was 50 rad. per minute with a peak rate of about 100 times that amount due to the pulsed nature of the radiation from the synchrotron. Distance from the platinum target to the geometric center of the test solutions was exactly 2 meters except for a very few experiments as shown in Table I.

The synchrotron was equipped with a transmission ionization chamber through which the X-ray beam passed. This instrument in combination with a commercial current integrator, indicated radiation amounts in "monitor units" on the control panel and was calibrated by absolute colorimeter measurement of the total content of a collimated X-ray beam. There was about a 0.7% disagreement between absolute calibration of the "monitor unit" on two occasions seven months apart: The experimental uncertainty is believed to be less than 1%.

After irradiation a portion of the irradiated sample was drawn off and placed in a sample cell of a conventional spectrophotometer, the cell size depending upon the optical density of the sample as is done conventionally. A comparison of the optical density between the irradiated samples and a blank was made. The wave length reported each case in Table I was that value at which an optimum absorption value was obtained. As shown by the "G" in every case, the sensitivity of the additive solutions compared favorably with that of the standard ferrous-ferric dosimetric solution which has a "G" of 15.5.

EXAMPLE II

A second set of experiments was undertaken to compare the sensitivity of several of the more responsive dosimetric complexing solutions of the invention with that of the conventional ferrous-ferric solution over a wide range of dosages. Except for the range of dosage, or as otherwise noted, procedures were identical with those used in Example I. Dosimetric solutions containing salicylic acid, phthalic acid, benzoic acid, benzoic and oxalic acids, and benzoic and tartaric acids were selected for the present purpose. Concentration of the benzoic acid was $1.3 \times 10^{-3}$ M in the solution containing only benzoic acid as a stabilizing agent; concentrations otherwise were indicated in Table I. Samples of all these solutions, in addition to a conventional ferrous-ferric standard, were then irradiated with total exposures of 400, 600,

Table I

| Fe$^{+2}$ Moles | Agent N | | | | H$_2$SO$_4$, N | Cell, cm. | Source to Sample (meters) | Monitor Units | Ang. | D° | G |
|---|---|---|---|---|---|---|---|---|---|---|---|
| 10×10$^{-4}$ | Succinic | 8.5×10$^{-3}$ | | | 0.08 | 50 | 0.978 | 10 | 3,020 | 0.0525 | ~25 |
| 10×10$^{-4}$ | Oxalic | 1.6×10$^{-3}$ | | | 0.08 | 50 | 0.978 | 10 | 3,020 | 0.105 | ~50 |
| 10×10$^{-4}$ | Lactic | 2.2×10$^{-3}$ | | | 0.08 | 50 | 0.978 | 10 | 3,020 | 0.273 | 130 |
| 10×10$^{-4}$ | Citric | 5.2×10$^{-3}$ | | | 0.15 | 50 | 0.978 | 10 | 3,020 | 0.1240 | 45–50 |
| 10×10$^{-4}$ | {Citric | 5.2×10$^{-3}$ | | | } 0.08 | 50 | 0.978 | 10 | 3,020 | 0.231 | 110 |
| | {Lactic | 2.2×10$^{-3}$ | | | | | | | | | |
| 10×10$^{-4}$ | Gelatin (Bacto) 0.1 g./liter | | | | 0.15 | 50 | 0.978 | 10 | 3,020 | 0.0625 | ~25 |
| 10×10$^{-4}$ | Hexylene glycol | 2×10$^{-2}$ | | | 0.08 | 50 | 0.978 | 10 | 3,020 | 0.105 | ~50 |
| 7.15×10$^{-4}$ | | | Phthalic | 1.4×10$^{-3}$ | 1.0 | 1 | 2 | 600 | 2,755 | 0.059 | 37 |
| 7.15×10$^{-4}$ | | | Benzoic | 1.4×10$^{-3}$ | 1.0 | 1 | 2 | 600 | 2,730 | 0.0775 | 45–50 |
| 7.15×10$^{-4}$ | | | do | 1.4×10$^{-3}$ | 1.0 | 1 | 2 | 600 | 2,602 | 0.095 | 69 |
| 3.56×10$^{-3}$ | Oxalic | 6×10$^{-2}$ | do | 8×10$^{-3}$ | 1.0 | 1 | 2 | 600 | 2,730 | 0.096 | 60 |
| 7.15×10$^{-4}$ | do | 8×10$^{-4}$ | do | 2.6×10$^{-4}$ | 1.0 | 1 | 2 | 600 | 2,730 | 0.096 | 60 |
| 7.15×10$^{-4}$ | Tartaric | 9×10$^{-4}$ | do | 7.15×10$^{-3}$ | 1.0 | 1 | 2 | 600 | 2,730 | 0.125 | 75–90 |
| 7.5×10$^{-4}$ | do | 9×10$^{-4}$ | do | 7.15×10$^{-3}$ | 1.0 | 1 | 2 | 600 | 2,730 | 0.208 | 130 |
| ~10$^{-3}$ | Malonic | ~10$^{-3}$ | | | 1.0 | 1 | 2 | 600 | 2,972 | 0.040 | 25 |
| ~10$^{-3}$ | Maleic | ~10$^{-3}$ | | | 1.0 | 1 | 2 | 600 | 3,000 | 0.064 | 40 |
| ~10$^{-3}$ | Succinic | ~10$^{-3}$ | | | 1.0 | 1 | 2 | 600 | 3,000 | 0.033 | 24 |
| ~10$^{-3}$ | Citric | ~10$^{-3}$ | | | 1.0 | 1 | 2 | 600 | 3,000 | 0.064 | 40 |
| ~10$^{-3}$ | Adipic | ~10$^{-3}$ | | | 1.0 | 1 | 2 | 600 | 3,000 | 0.048 | 30 |
| ~10$^{-3}$ | 1,2,3,4 butane tetracarboxylic | ~10$^{-3}$ | Benzoic | ~10$^{-3}$ | 1.0 | 1 | 2 | 600 | 2,730 | 0.059 | 37 |
| ~10$^{-3}$ | Adipic and Oxalic | ~10$^{-3}$ | do | ~10$^{-3}$ | 1.0 | 1 | 2 | 600 | 2,730 | 0.0480 | ~30 |
| ~10$^{-3}$ | Maleic and Oxalic | ~10$^{-3}$ | do | ~10$^{-3}$ | 1.0 | 1 | 2 | 600 | 3,000 | 0.0510 | 32 |
| ~10$^{-3}$ | Citric and Oxalic | ~10$^{-3}$ | do | ~10$^{-3}$ | 1.0 | 1 | 2 | 600 | 3,000 | 0.0640 | 40 |
| ~10$^{-3}$ | Tartaric and Oxalic | ~10$^{-3}$ | do | ~10$^{-3}$ | 1.0 | 1 | 2 | 600 | 3,000 | 0.080 | 50 |
| 7.15×10$^{-4}$ | | | Salicylic | ~10$^{-3}$ | 1.0 | 1 | 2 | 600 | 2,910 | 0.043 | 27 |
| 7.15×10$^{-4}$ | | | | ~10$^{-3}$ | 1.0 | 1 | 2 | 600 | 2,960 | | |
| 7.15×10$^{-4}$ | | | Aspirin | ~10$^{-3}$ | 1.0 | 1 | 2 | 600 | 2,750 | 0.035 | 22 |
| 7.15×10$^{-4}$ | Formic | | | ~10$^{-3}$ | 1.0 | 1 | 2 | 600 | 2,900 | 0.025 | 15.5+ |
| 7.15×10$^{-4}$ | Acetic | | | ~10$^{-3}$ | 1.0 | 1 | 2 | 600 | 2,945 | 0.033 | 21 |

1000 and 3000 monitor units. Other samples of all the solutions except that containing benzoic and tartaric acids were further irradiated with total exposures of 6000 and 9000 monitor units. One sample of the solution containing salicylic acid was irradiated with an exposure of 12,000 monitor units. Sensitivities of the solutions determined from the resulting optical densities are shown in Fig. 1 in which the ratios of the optical densities of the stabilized solutions to that of the conventional ferrous-ferric solutions are plotted for various dosages. As shown in Fig. 1 the salicylic acid solution is almost twice as sensitive as the conventional ferrous-ferric dosimetric solution, the phthalic acid solution and the benzoic acid solution almost three times as sensitive, the benzoic acid-oxalic acid over four times as sensitive, and the benzoic acid-tartaric acid solution almost nine times as sensitive as the ferrous-ferric solution. No particular effort was made to select concentrations and wave lengths which would yield optimum sensitivity and therefore somewhat higher sensitivities will be achievable in certain instances. It is noteworthy that the sensitivity remained relatively constant with the increase in dose in every case indicating reliability over an extended dosage range and simplicity since only a single sensitivity dosimeter will serve for such a range.

EXAMPLE III

In order to determine the linearity of the change in optical density of the new complexing solutions with increasing dose increments a series of determinations of optical density with increasing dose were made. Benzoic acid was selected as representative of the stabilizing agents. A stock solution was made up in the manner indicated in Example I in which the final concentrations were 7.15×10$^{-4}$ M ferrous sulfate, 1.4×10$^{-3}$ M benzoic acid and 1 N sulfuric acid. Irradiations and optical density measurements were carried out with the procedure as in Example I. Optical measurements were made at a wave length of 2730 A. The variation of optical density with dose is listed in Table II and plotted in Fig. 2, in both of which the exposure is giving in the hereinbefore mentioned "monitor units," equivalent to rads for the specific exposure geometry on multiplication by a calibration factor of 0.933. It may be seen that the optical density increases linearly with dose within a very small limit of error:

Table II

| Monitor units: | Optical density |
|---|---|
| 0 | 0.000 |
| 100 | 0.030 |
| 150 | 0.0350 |
| 300 | 0.0440 |
| 600 | 0.0780 |
| 900 | 0.1090 |
| 1500 | 0.1610 |
| 2100 | 0.225 |
| 2100 | 0.233 |
| 2500 | 0.2550 |
| 3500 | 0.345 |
| 3500 | 0.355 |

While there has been described in the foregoing what may be considered to be preferred embodiments of the invention, modifications may be made therein without departing from the teachings of the invention and it is intended to cover all such as fall within the scope of the appended claims.

What we claim is:

1. A dosimetric system for measuring and indicating the dose absorbed from ionizing radiation comprising an aqueous sulfuric acid solution of ferrous sulfate together with an organic compound having carboxylic and hydroxy groups therein capable of complexing iron ions in the solution so as to stabilize and sensitize the system to provide a reliable indication of the amount of irradiation to which said system is subjected.

2. A dosimetric system for measuring and indicating the dose absorbed from ionizing radiation comprising an aqueous sulfuric acid solution of ferrous sulfate containing a stabilizing-sensitizing agent selected from the group consisting of benzoic, phthalic, salicylic, oxalic, citric, succinic, lactic, phenolic, tartaric, sulfosalicylic, acetic, 1,2,3,4 butane tetracarboxylic, malonic, maleic and adipic acids, aspirin, and hexylene glycol capable of complexing iron ions in the solution so as to stabilize and sensitize the system to provide a reliable indication of the amount of irradiation to which said system is subjected.

3. A dosimetric system for measuring and indicating the dose absorbed from ionizing radiation comprising an aqueous sulfuric acid solution of ferrous sulfate together with an organic acid agent for complexing iron ions in said solution so as to stabilize and sensitize the response of the system to provide a reliable indication of the irradiation dosage.

4. The system as defined in claim 3 wherein said agent comprises a hydroxy carboxylic acid.

5. The system as defined in claim 3 wherein said agent comprises an aliphatic carboxylic acid.

6. The system as defined in claim 3 wherein said agent comprises an aromatic carboxylic acid.

7. The system as defined in claim 3 wherein said agent comprises a pinacone.

8. A dosimetric system for measuring and indicating the dosage absorbed from ionizing radiation comprising an aqueous sulfuric acid solution having a concentration in the range of about 0.1 to 2.0 N and with ferrous sulfate dissolved therein together with at least one stabilizing-sensitizing agent selected from the group consisting of benzoic, phthalic, salicylic, oxalic, citric, succinic, lactic, phenolic, tartaric, sulfosalicylic, acetic, 1,2,3,4 butane tetracarboxylic, malonic, maleic and adipic acids, aspirin, and hexylene glycol.

9. The system as defined in claim 8 wherein the ferrous sulfate has a concentration in the range of about $10^{-4}$ to $2 \times 10^{-3}$ M.

10. The system as defined in claim 8 wherein said agent has a concentration of the order of $10^{-2}$ to $10^{-4}$ M.

11. The system as defined in claim 8 wherein said agent comprises benzoic acid.

12. The system as defined in claim 8 wherein said agent comprises a mixture of benzoic and oxalic acids.

13. The system as defined in claim 8 wherein said agent comprises a mixture of benzoic and tartaric acids.

14. The system as defined in claim 8 wherein said agent comprises phthalic acid.

15. The system as defined in claim 8 wherein said agent comprises salicylic acid.

References Cited in the file of this patent
UNITED STATES PATENTS

| | | |
|---|---|---|
| 2,700,736 | Roberts | Jan. 25, 1955 |
| 2,824,234 | Schulte et al. | Feb. 18, 1958 |